United States Patent [19]
Camberlin et al.

[11] Patent Number: 5,470,920
[45] Date of Patent: Nov. 28, 1995

[54] IMPREGNATING SOLUTIONS BASED ON AT LEAST ONE REACTIVE THERMOPLASTIC POLY (IMIDE-AMIDE) OLIGOMER AND A COREACTANT, WHICH CAN BE USED ESPECIALLY FOR THE PRODUCTION OF PREIMPREGNATED INTERMEDIATE ARTICLES

[75] Inventors: Yves Camberlin, Caluire; René Dien, Millery; Philippe Michaud, Lyons, all of France

[73] Assignee: Ciba-Geigy Corporation, Ardsley, N.Y.

[21] Appl. No.: 122,600

[22] PCT Filed: Apr. 3, 1992

[86] PCT No.: PCT/FR92/00298

§ 371 Date: Oct. 1, 1993

§ 102(e) Date: Oct. 1, 1993

[87] PCT Pub. No.: WO92/17526

PCT Pub. Date: Oct. 15, 1992

[30] Foreign Application Priority Data

Apr. 4, 1991 [FR] France .................. 91 04382

[51] Int. Cl.⁶ .................. C08G 73/14; C08L 79/08
[52] U.S. Cl. .................. 525/421; 525/422; 525/419; 525/426; 525/436; 526/262
[58] Field of Search .................. 525/419, 426, 525/421, 422, 436; 526/262

[56] References Cited

U.S. PATENT DOCUMENTS

| | | | |
|---|---|---|---|
| 3,018,290 | 1/1962 | Sauers et al. | 260/326.3 |
| 3,535,403 | 10/1970 | Holub et al. | 260/837 |
| 4,927,899 | 5/1990 | Michand et al. | 528/49 |
| 4,927,900 | 5/1990 | Michand et al. | 528/49 |
| 4,987,207 | 1/1991 | Yamaya | 528/170 |
| 5,053,474 | 10/1991 | Camberlin et al. | 528/87 |
| 5,086,154 | 2/1992 | Camberlin et al. | 528/73 |
| 5,112,924 | 5/1992 | Chu | 525/426 |
| 5,194,518 | 3/1993 | Shari | 525/426 |
| 5,247,047 | 9/1993 | Hosogane | 528/49 |

FOREIGN PATENT DOCUMENTS

| | | |
|---|---|---|
| 0182589 | 5/1986 | European Pat. Off. |
| 0376892 | 7/1990 | European Pat. Off. |
| 2629088 | 9/1989 | France |
| 2629087 | 9/1989 | France |
| 2638163 | 4/1990 | France |
| 2649712 | 1/1991 | France |
| 7044626 | 3/1982 | Japan |
| 9191726 | 10/1984 | Japan |
| 2212390 | 9/1987 | Japan |
| 3277614 | 12/1991 | Japan |
| 852651 | 10/1960 | United Kingdom |

OTHER PUBLICATIONS

Patent Abstracts of Japan No.: JP58168657.
Patent Abstracts of Japan No.: JP63308037.
Derwent Abstract, 90–203224/27 EP 376892.
Derwent Abstract, 91–016656/03, France 2,649,712.
Derwent Abstract, 90–134011/18 France 2,638,163
Derwent Abstract, 89–294711/41, France 2,629,088.
Derwent-Abstract, 89–280091/39, France 2,629,087.

*Primary Examiner*—Joseph L. Schofer
*Assistant Examiner*—I. Zemel
*Attorney, Agent, or Firm*—William A. Teoli, Jr.

[57] ABSTRACT

The present invention relates to impregnating solutions consisting:

of an active principle A+B in which: A denotes at least one thermoplastic poly(imide-amide) oligomer functionalized at the chain ends with an alkenyloxy, maleimido or nadimido group, B denotes a coreactant chosen from: B1=an imide ingredient, B2=an acrylate ingredient, B3=an alkenylphenol ingredient, B4=a novolac resin, B5=a vinyl ingredient, B6=an epoxy resin, B7=an amino ingredient and B8=a mixture of a number of ingredients B1 to B7;

and of one or a number of aprotic polar solvent(s), the concentration of the active principle in the solution being between 2 and 80% by weight.

These solutions are employed especially for the production of preimpregnated intermediate articles.

19 Claims, No Drawings

IMPREGNATING SOLUTIONS BASED ON AT LEAST ONE REACTIVE THERMOPLASTIC POLY (IMIDE-AMIDE) OLIGOMER AND A COREACTANT, WHICH CAN BE USED ESPECIALLY FOR THE PRODUCTION OF PREIMPREGNATED INTERMEDIATE ARTICLES

The present invention relates to solutions consisting of at least one reactive thermoplastic poly(imide-amide) oligomer, an appropriate coreactant and at least one organic solvent, which can be used especially for the production of preimpregnated intermediate articles by employing the filament winding technique or that for the impregnation of various fibrous materials. It also relates to the active principle of these solutions, consisting of the mixture of at least one reactive thermoplastic poly(imide-amide) oligomer with a coreactant, which can be used for the preparation of the abovementioned solutions. It also relates to the preimpregnated intermediate articles obtained from these solutions.

Preimpregnated (or composite) intermediate articles are used in a known manner for the production of components of various shapes and for various purposes in many industries such as, for example, in aeronautics. These components, which may be components of revolution, are obtained by laying a number of layers of prepregs on a mold or a support. Curing of the impregnating resin is then carried out under the usual technological conditions pertaining to composite materials and in particular at temperatures of between 100° and 300° C.

For impregnation by a solvent route, use has hitherto essentially been made of solutions comprising (as active principle acting as impregnating resin) of a heat-curable polyimide oligomer obtained by reacting an N,N'-bisimide of an unsaturated dicarboxylic acid with an appropriate coreactant. With such impregnating resins, after the solvent has been removed, composites are obtained which give it a very good heat behavior (they withstand, without degrading, temperatures of 200° to 300° C. for a relatively long period, of the order of 10,000 to 100 hours), but this good heat stability is counterbalanced by a relatively brittle nature of the material; to give an idea, it can be pointed out that the value of the energy of propagation of a GlC crack (measured on a unidirectional composite based on carbon fibers, containing 40 g of resin per 60 g of fibers) is then of the order of 100 to 200 J/m$^2$, which is an inadequate value.

Patent Application EP-A-182589 describes compositions for impregnation including a polyamide-imide polymer resin containing an acid amide functionality in sufficient quantity to make it soluble in an organic solvent and then to be hydrolysed in the presence of water.

Finally, Patent Application EP-A-376892 describes compositions including polyamide-imide polymer resins which can be combined, inter alia with certain resins such an epoxy resin or a bismaleimide.

Continuing its work in this field of the art, the Applicant Company has attempted to develop an improved impregnating solution, that is to say an impregnating solution which not only results in good heat stability but in addition offers access to a composite which has a better impact strength; in this context it is desirable that the value of the GlC toughness referred to above should be higher than 400 J/m$^2$. Furthermore, the Applicant Company has attempted to develop an impregnating solution in which the active principle forming the impregnating resin which remains on the substrate after the removal of the solvent has a rheology which is perfectly adapted to the processing requirements: in particular, it is desirable that the impregnating resin should, on the one hand, have a marked adhesive nature at ambient temperature (an adhesive resin is intended to define a resin which, when deposited on the substrate and being at ambient temperature, enables this substrate to be positioned merely by pressure and to remain in contact in any position) and, on the other hand, at temperatures between 100° and 300° C. exhibits a flow ratio of between 1 and 20% by weight (weight of resin which has flowed in relation to the weight of the combined resin+substrate).

There have now been found, this being the first subject of the present invention, new impregnating solutions which have the abovementioned properties, in which the active principle consists of the mixture of at least one reactive thermoplastic poly(imide-amide) oligomer with an appropriate coreactant.

More precisely, the present invention, taken as its first subject, relates to impregnating solutions consisting of an active principle abased on a reactive oligomer and at least one organic solvent for the said oligomer, which are characterized by the following points 1 and 2:

point 1: the active principle consists of a mixture of A with B, in which:

*A denotes at least one reactive thermoplastic poly(imide-amide) oligomer chosen from the group made up of:

A1: a linear aromatic poly(imide-amide) oligomer whose chains contain alkenyloxy end groups which is obtained by direct reaction of an aromatic diisocyanate, of a monoanhydride of a tricarboxylic acid and of a monocarboxylic acid by an alkenyloxy group;

A2: a linear aromatic poly(imide-amide) oligomer whose chains contain end groups of maleimido type, optionally substituted on the maleic double bond and obtained by direct reaction of an aromatic diisocyanate, a monoanhydride of a tricarboxylic acid and of a monocarboxylic acid substituted by a maleimido group, itself optionally substituted;

A3: a linear aromatic poly(imide-amide) oligomer whose chains contain end groups each of which includes a residue with a latent maleimide functional group, obtained by direct reaction of an aromatic diisocyanate, of a monoanhydride of a tricarboxylic acid and of a carboxylic acid containing a residue with a latent maleimide functional group;

*B denotes a coreactant consisting of one or more ingredient(s) chosen from:

B1: an imide ingredient consisting of one or more compound(s) containing (an) imide group(s) taken from pe [sic] group made up of:

B1.1 the monoimides of formula:

in which: each of the symbols Y, which are identical or different, denotes H, CH$_3$ or Cl, and R$_1$ denotes a hydrogen atom or an aliphatic (saturated or otherwise), cycloaliphatic (saturated or otherwise) or aromatic monovalent hydrocarbon radical containing up to 20 carbon atoms, optionally substituted by a chlorine atom, an alkoxy radical or an alkenyloxy radical;

B1.2 the N,N'-bisimides of formula:

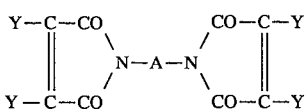  (II)

in which:
the symbol Y has the meaning given above;
the symbol A denotes a divalent radical chosen from the group consisting of the following radicals: cyclohexylene, phenylene, 4-metyl-1,3-phenylene [sic], 2-methyl-1,3-phenylene, 5-methyl-1,3-phenylene, 2,5-diethyl-3-methyl-1,4-phenylene, and the radicals of formula:

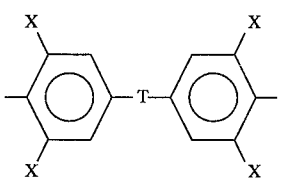

in which T denotes a single valency bond or a group:

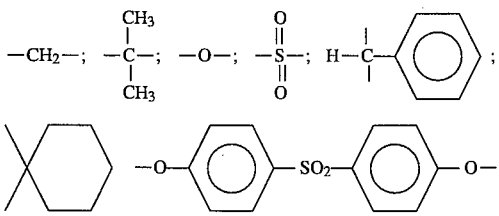

and each of the symbols X, which are identical or different, denotes a hydrogen atom or a methyl, ethyl or isopromyl [sic] radical;

B2: an acrylate ingredient consisting of one or more compound(s) of general formula:

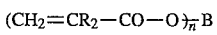  (III)

in which:
the symbol $R_2$ denotes a hydrogen atom or a methyl radical;
n denotes a whole or fractional number equal to at least 1 and equal to not more than 8;
the symbol B denotes an organic radical of valency n, derived: from a saturated, linear or branched aliphatic residue containing from 1 to 30 carbon atoms and capable of containing one or more oxygen bridge(s) and/or one or a number of free hydroxyl functional group(s); from an aromatic residue (of aryl or arylaliphatic type) containing from 6 to 150 carbon atoms, consisting of a benzene nucleus, capable of being substituted by one to three alkyl radicals containing from 1 to 5 carbon atoms, or of a number of benzene nuclei optionally substituted as indicated above and joined one to another by a single valency bond, an inert group or an alkylene radical containing from 1 to 3 carbon atoms, it being possible for the said aromatic residue to contain in various places in its structure one or more oxygen bridge(s) and one or a number of free hydroxyl functional group(s), it being possible for the free valency(ies) of the aromatic radical B to be carded by a carbon atom of an aliphatic chain and/or by a carbon atom of a benzene nucleus;

B3: an alkenylphenol ingredient consisting of one or more compound(s) of general formula:

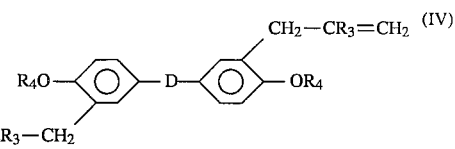  (IV)

in which:
the symbol D denotes a single valency bond or divalent radical chosen from the group made up of the radicals:

each of the symbols $R_3$, which are identical or different, denotes a hydrogen atom or a methyl radical;
each of the symbols $R_4$, which are identical or different, denotes a hydrogen atom or a linear or branched alkyl radical containing from 1 to 6 carbon atoms or a phenyl radical;

B4: a phenol/formaldehyde polycondensate of thermoplastic nature in which the molar ratio of formaldehyde to phenol is between 0.6 and 0.95 and which has a softening point, of "ring and ball" type, measured according to NF standard T 51 437, ranging from 50° to 110° C.;

B5: an ingredient other than an acrylate, containing a vinyl double bond and chosen from vinylpyridines, N-vinyl-2-pyrrolidone, vinyltetrahydrofuran, styrene and mixtures thereof;

B6: a nonhalogenated epoxy resin;

B7: an amino ingredient consisting of one or a number of hindered diprimary diamine(s) taken from the group made up of:

B7.1 the species corresponding to the general formula:

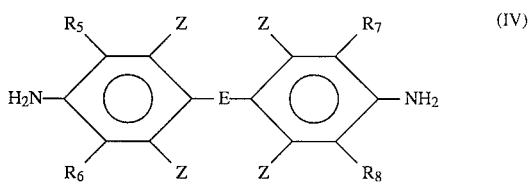  (IV)

in which:
each of the symbols $R_5$, $R_6$, $R_7$ and $R_8$, which are identical or different, denotes a methyl, ethyl, propyl or isopropyl radical;
each of the symbols Z, which are identical or different, denotes a hydrogen atom or a chlorine atom;
the symbol E denotes a divalent radical chosen from the group made up of the radicals: —$CH_2$—;

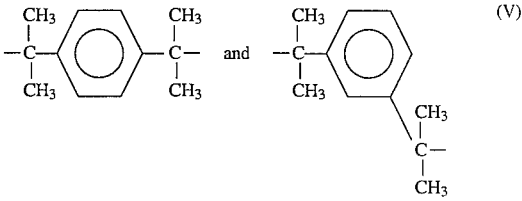  (V)

B7.2 the species corresponding to the general formula:

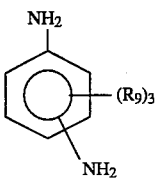

(VI)

in which:
the amino radicals are in meta or para position relative to one another;
each of the syrhbols $R_9$ which are identical or different, denotes a methyl, ethyl, propyl or isopropyl radical;
and B8: a mixture of two or more than two of the abovementioned ingredients B1 to B7 with each other;
point 2: the concentration of the active principle, expressed as weight of mixture A+B relative to the combined (A+B)+solvent(s), is between 2% and 80%.

Solvents that are suitable are aprotic polar solvents. By way of specific examples of suitable solvents there may be mentioned: dioxane, tetrahydrofuran, dibutyl ether, methyl ethyl ketone, cyclohexanone, N,N-dimethylacetamide, N,N-dimethylformamide, N-methyl-2-pyrrolidone, dimethyl sulfoxide, 1,1,3,3-tetramethylurea, 1,3-dimethylurea and a mixture of these solvents. The solvent(s) used is (are) preferably taken from the group made up of N,N-dimethylacetamide, N,N-dimethylformamide, N-methyl-2-pyrrolidone, dimethyl sulfoxide, 1,1,3,3-tetramethylurea, 1,3-dimethylurea and a mixture of these compounds.

The concentration of the active principle A+B is, as can be seen, between 2% and 80%. The quantity of solvent(s) used is preferably chosen so that this concentration is between:

30% and 60% when this solution is used within the scope of the filament winding technique or that of impregnation using doctor blade or curtain coating, and 50% and 80% when this solution is used within the scope of the technique of impregnation using transfer.

The reactive thermoplastic poly(imide-amide) oligomers A1, A2 and A3 which are suitable for making use of the present invention are the oligomers which are described in detail in the patent applications filed by the Applicant Company and cited below:

A1:cf. U.S. Pat. No. 4,927,899, A2:cf. U.S. Pat. No. 4,927,900, and A3:cf. U.S. Pat. No. 5,086,154, the substance of these various documents is incorporated herein by reference.

Specific examples of suitable oligomers which may be mentioned are the species A1, A2 and A3 which are obtained by direct reaction:
(in the case of the three species) of an aromatic diisocyanate taken from the group made up of:
4,4'-diisocyanato-2,2-diphenylpropane,
4,4'-diisocyanatodiphenylmethane,
4,4'-diisocyanatobiphenyl,
4,4'-diisocyanatodiphenyl sulfide,
4,4'-diisocyanatodiphenyl sulfone,
4,4'-diisocyanatodiphenyl ether,
4,4'-diisocyanato-1,1-diphenylcyclohexane;
with (in the case of the three species) a monoanhydride of a tricarboxylic acid taken from the group made up of:
the monoanhydride of trimellitic acid,
the 2,3-monoanhydride of 2,3,6-naphthalenetricarboxylic acid,
the 1,8-monoanhydride of 1,8,4-naphthalenetricarboxylic acid,
the 1,2-monoanhydride of 1,2,5-naphthalenetricarboxylic acid,
the 3,4-monoanhydride of 3,4,4'-diphenyltricarboxylic acid,
the 3,4-monoanhydride of diphenyl sulfone 3,4,3'-tricarboxylic acid,
the 3,4-monoanhydride of diphenyl ether 3,4,4'-tricarboxylic acid,
the 3,4-monoanhydride of 3,4,4'-benzophenonetricarboxylic acid,
the 3,4-monoanhydride of 3,4,3 '-diphenylisopropylidenetricarboxylic acid;
and with a monocarboxylic acid containing a substituent taken from the group made up of:
* in the case of A1 where the said substituent is of alkenyloxy type:
2-allyloxybenzoic acid,
3-allyloxybenzoic acid,
4-allyloxybenzoic acid,
2-methallyloxybenzoic acid,
3-methallyloxybenzoic acid,
4-methallyloxybenzoic acid;
*in the case of A2 where the said substituent is of maleimido type:
2-maleimidobenzoic acid,
3-maleimidobenzoic acid,
4-maleimidobenzoic acid,
2-citraconimidobenzoic acid,
3-citraconimidobenzoic acid,
4-citraconimidobenzoic acid,
4-(maleimidomethyl)benzoic acid.
* in the case of A3 where the said substitiuent contains a residue with a latent maleimide functional group:
2-(1,2,3,6'tetrahydrophthalimido)benzoic acid,
3-(1,2,3,6-tetrahydrophthalimido)benzoic acid,
4-(1,2,3,6-tetrahydrophthalimido)benzoic acid,
2-nadimidobenzoic or 2-(3,6-endomethylene-1,2,3,6-tetrahydrophthalimido)benzoic acid,
3-nadimidobenzoic acid,
4-nadimidobenzoic acid,
2-(α-methylnadimido)benzoic acid or
2-(4-methyl-3,6-andomethylene-1,2,3,6-tetrahydrophthalimido)benzoic acid, [sic]
3-(α-methylnadimido)benzoic acid,
4-(α-methylnadimido)benzoic acid,
2-(3,6-endooxy-1,2,3,6-tetrahydrophthalimido)benzoic acid,
3-(3,6-endooxy-1,2,3,6-tetrahydrophthalimido)benzoic acid,
4-( 3,6-endooxy-1,2,3,6-tetrahydrophthalimido)benzoic acid.

The constituent A employed is preferably at least one oligomer chosen from the group made up of the species A2 and A3 which are obtained by direct reaction:
(in the case of the two species) of an aromatic diisocyanate consisting of 4,4'-diisocyanatodiphenylmethane or 4,4'-diisocyanatodiphenyl ether;
with (in the case of the two species) a monoanhydride of a tricarboxylic acid consisting of the monoanhydride of trimellitic acid;
and with a monocarboxylic acid containing a substituent consisting:
* in the case of A2: of 4-maleimidobenzoic acid;
* in the case of A3: of 4-nadimidobenzoic acid or 4-(α-methylnadimido)benzoic acid.

The second essential constituent of the active principle is a coreactant B consisting of one or more ingredient(s) chosen from the abovementioned ingredients B1 to B8.

Specific examples of suitable monoimides B1.1 of formula (I) which may be mentioned are: maleimide, N-phenylmaleimide, N-phenyl(methyl)maleimide, N-phenyl(chloro)maleimide, N-(p-chloro)phenylmaleimide, N-(p-methoxy)phenylmaleimide, N-allylmaleimide and N-(2,3 or 4-allyloxy)phenylmaleimides.

By way of specific examples of suitable bismaleimides B1.2 of formula (II) there may be mentioned:
N,N'-meta-phenylenebismaleimide,
N,N'-para-phenylenebismaleimide,
N,N'-4,4'-diphenylmethanebismaleimide,
N,N'-4,4'-diphenyl ether bismaleimide,
N,N'-4,4'-diphenyl sulfone bismaleimide,
N,N'- 1,4-cyclohexylenebismaleimide,
N,N'-4,4'-(1,1-diphenylcyclohexane)bismaleimide,
N,N'-4,4'-(2,2-diphenylpropane)bismaleimide,
N,N'-4,4'-diphenylmethanebismaleimide,
N,N'-2-methyl-1,3-phenylenebismaleimide,
N,N'-4-methyl-1,3-phenylenebismaleimide,
N,N'-5-methyl- 1,3-phenylenebismaleimide.

These bismaleimides can be prepared by the processes described in U.S. Patent U.S. patent application No. 3,018,290 and British Patent GB-A-1,137,290.

The coreactant B of B1 kind employed is preferably N,N'-4,4'-diphenylmethanebismaleimide taken by itself or mixed with N,N'-2-methyl-1,3-phenylenebismaleimide, N,N'-4-methyl-1,3-phenylenebismaleimide, N,N'- 5-methyl-1,3ophenylenebismaleimide and/or N-phenylmaleimide.

As suitable acrylate ingredient B2 there may be mentioned:

B2.1 mono(meth)acrylates corresponding to the formula (III) in which:

n=1, and

B denotes a monovalent organic radical of formula:

$$\!-\!(CH_2CH_2O)_{\overline{m}}B_1 \qquad (VII)$$

in which:

$B_1$ denotes a linear or branched alkyl radical containing from 1 to 6 carbon atoms or a phenyl radical, and m is a whole or fractional number situated in the range from zero to 5;

B2.2 the di(meth)acrylates corresponding to the formula (III) in which:

n=2, and

B denotes a divalent organic radical of formula:

$$\!-\!(CH_2CH_2O)_{\overline{p}}B_2\!-\!(OCH_2CH_2)_{\overline{q}}\!-\! \qquad (VIII)$$

in which:

$B_2$ denotes a linear or branched alkylene divalent radical containing from 2 to 9 carbon atoms and capable of containing one or more oxygen bridge(s) or a radical of formula:

—⟨◯⟩—U—⟨◯⟩— in which the symbol U denotes a single valency bond or a group:

$$-\!\underset{\underset{CH_3}{|}}{\overset{\overset{CH_3}{|}}{C}}\!-; \quad -\!O\!-; \quad -\!\underset{\underset{O}{\|}}{\overset{\overset{O}{\|}}{S}}\!-;$$

each of the symbols p and q, which are identical or different, denoting a whole or fractional number situated in the range from zero to 5;

B2.3 the tri- and tetra(meth)acrylates corresponding to the formula (III) in which:

n=3 or 4, and

B denotes a trivalent or tetravalent organic radical derived from a linear or branched, saturated aliphatic radical containing from 3 to 20 carbon atoms and capable of containing one or more oxygen bridge(s) and/or one or a number of free hydroxyl functional group(s);

B2.4 novolac epoxy (meth)acrylates which, while corresponding to the formula (III) are here denoted by the following formula:

(IX)

in which:

the symbol $R_2$ has the meaning given above in connection with formula (III);

the symbol $R_{10}$ denotes a hydrogen atom or a methyl radical;

t is a whole or fractional number situated in the range from 0.1 to 7;

B2.5 mixtures of a number of acrylates and/or methacrylates of the same type [B2.1, B2.2, B2.3 or B2.4] with each other or mixtures of methacrylate(s) of the same type with one or more acrylate(s) and/or methacrylate(s) of another type.

Specific examples of suitable acrylate ingredient B2.1 which may be mentioned in particular are: methyl mono(meth)acrylates, (monooxyethylated)phenol mono(meth)acrylates and (dioxyethylated)phenol mono(meth)acrylates.

Specific examples of suitable acrylate ingredient B2.2 which may be mentioned are: ethylene glycol di(meth)acrylates, 1,4-butanediol di(meth)acrylates, 1,6-hexanediol di(meth)acrylates, tripropylene glycol di(meth)acrylates, di(meth)acrylates of the following diphenols, di(mono- or polyoxyethylated) or otherwise: 4,4'-dihydroxydiphenylmethane, bisphenol A, 4,4'-dihydroxydiphenyl ether and in particular di(meth)acrylates of di(monooxyethylated) bisphenol A or di(meth)acrylates of di(polyoxyethylated)

bisphenol A [cf. formula (VIII) in which B₂ denotes the radical:

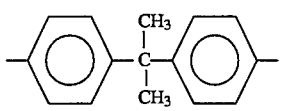

and p=q=a whole or fractional number situated in the range from 1 to 3].

Specific examples of suitable acrylate ingredient B2.3 which may be mentioned in particular are: 1,2,4-butanetriol tri(meth)acrylates, 1,2,6-hexanetriol tri(meth)acrylates, trimethylolpropane tri(meth)acrylates, pentaerythritol tri(meth)acrylates and pentaerythritol tetra(meth)acrylates.

Novolac epoxy (meth)acrylates B2.4 are known products some of which are available commercially. They can be prepared by reacting (meth)acrylic acids with an epoxy resin of novolac type, the latter being the product of reaction of epichlorohydrin and of phenol/formaldehyde polycondensates [R₁₀ in the formula (IX) given above is then a hydrogen atom] or cresol/formaldehyde polycondensates [R₁₀ in the formula is then a methyl radical]. These oligomer polyacrylates B2.4 and a process for preparing them are to be found described, for example, in U.S. patent application No. 3,535,403.

Specific examples of suitable acrylate ingredient B2.4 which may be mentioned in particular are the novolac epoxy acrylates of formula (IX) in which $R_2$ and $R_{10}$ denote a hydrogen atom and t is a whole or fractional number situated in the range from 0.1 to 5.

Specific examples of suitable acrylate ingredient B2.5 which may be mentioned are mixtures of novolac epoxy (meth)acrylates B2.4 with not more than 30% by weight, relative to the weight of the mixture B2.4+B2.3, of a triacrylate and/or a trimethacrylate corresponding to the definitions given above in connection with the acrylate ingredient B2.3.

The coreactant of B of B2 kind which is preferably employed is an acrylate ingredient taken from the group made up of: di(mono or polyoxyethylated) di(meth)acrylates of bisphenol A, of formula (VIII) in which p=q=a whole or fractional number situated in the range from 1 to 3, and novolac epoxy acrylates of formula (IX) in which $R_2$ and $R_{10}$ denote a hydrogen atom and t is a whole or fractional number situated in the range from 0.1 to 5, these compounds being taken by themselves or mixed with not more than 30% by weight, relative to the weight of the mixture, of trimethylolpropane triacrylate.

Specific examples of suitable alkenylphenol ingredient B3 of formula (IV) which may be mentioned in particular are:
4,4'-dihydroxy-3,3'-diallylbisphenyl,
di(4-hydroxy-3-allylphenyl)methane,
di(4-hydroxy-3-allylphenyl) ether,
2,2-di(4-hydroxy-3-allylphenyl)propane or O,O'-diallyl bisphenol A,
the methyl ether corresponding to any of the abovementioned alkenylphenols.

As is well known, alkenylphenols are prepared by thermal (Claisen) rearrangement of phenol allyl ethers, which allyl ethers are obtained in a manner which is known per se by reacting, for example, phenols and allyl chloride in the presence of an alkali metal hydroxide and of solvent.

The expression which appears above "an alkenylphenol ingredient consisting of one or more compound(s)" is intended to mean that the ingredient B3 may consist:

either of one or more alkenylphenol(s) of formula (IV), or of a mixture containing (i) one or more alkenylphenol(s) of formula (IV) and (ii) one or more allyl ether(s) corresponding to this (or these) phenol(s), that is to say one or more allyl ether(s) from which this (or these) phenol(s) is (are) derived by rearrangement. Such a mixture (ii), which may be advantageously employed, is, for example, the crude product obtained by partial thermal rearrangement of the corresponding allyl ether(s).

The coreactant B of B3 kind which is employed is preferably an alkenylphenol ingredient consisting of O,O'-diallyl bisphenol A taken by itself or mixed with the diallyl ether of bisphenol A.

The polycondesates B4 which can be employed are well known. They are described especially in the "Encyclopedia of Polymers Science and Technology" [sic], volume 10, pages 4 et seq., 1969 edition from Interscience Publihsers [sic]. They are generally obtained by acidic catalysis and are known by the name of "novolac" resin.

The coreactant B of B4 kind which is employed is preferably a phenol/formaldehyde polycondensate in which the molar ratio of formaldehyde to phenol is between 0.65 and 0.85 and which has a softening point ranging from 60° C. to 95° C.

A nonhalogenated epoxy resin B6 is intended to define an epoxy resin which has an epoxy equivalent weight of between 100 and 1000 and which consists of a glycidyl ether obtained by reacting with epichlorohydrin a nonhalogenated polyphenol chosen from the group made up of: the class of di(hydroxyphenyl)alkanes such as 2,2-di(4-hydroxyphenyl)propane, di(4-hydroxyphenyl)methane, di(4-hydroxyphenyl)methylphenylmethane, di(4-hydroxyphenyl)tolylmethanes, resorcinol, hydroquinone, pyrocatechol, 4,4'-dihydroxydiphenyl and the products of condensation of the abovementioned phenols with an aldehyde.

The expression "epoxy equivalent weight" which appears above may be defined as being the weight of resin (in grams) containing one epoxy functional group

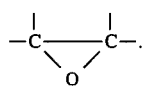

The coreactant B of B6 kind which is employed is preferably an epoxy resin which has an epoxy equivalent weight of between 150 and 300 and consists of a resin belonging to the class of the glycidyl ethers of di(hydroxyphenyl)alkanes which were discussed above in connection with the detailed definition of the resin B6.

Specific examples of suitable hindered diamines B7 of formulae (V) and (VI) which may be mentioned in particular are:
4,4'-diamino-3,3'-5,5'-tetramethyldiphenylmethane,
4,4'-diamino-3,3'-5,5'-tetraethyldiphenylmethane,
4,4'-diamino-3,5-dimethyl-3',5'-diethyldiphenylmethane,
4,4'-diamino-3,3'-diethyl-5,5'-dimethyldiphenylmethane,
4,4'odiamino-3,3',5,5'-tetraisopropyldiphenylmethane,
4,4'-diamino-3,3'-diisopropyl-5,5'-dimethyldiphenylmethane,
1,4-bis(4-amino-3,5-dimethyl-α, α-dimethylbenzyl)benzene,
1,3-bis(4-amino-3,5-dimethyl-α, α-dimethylbenzyl)benzene,
1,3-diamino-2,4-diethyl-6-methylbenzene,
1,3-diamino-2-methyl-4,6-diethylbenzene.

These hindered diamines can be prepared by processes described in British Patent GB-A-852,65 1 and U.S. Patent U.S. patent applicaiton No. 3,482,900.

The coreactant B of B7 kind employed is preferably an amino ingredient consisting of 4,4'-diamino-3,3',5,5'-tetramethyldiphenylmethane, 4,4'-diamino-3,3',5,5'-tetraethyldiphenylmethane, 4,4'-diamino-3,3'-diethyl-5,5'-dimethyldiphenylmethane and mixtures thereof.

With regard to the coreactant B of B8 kind, which is a mixture of two or more than two of the abovementioned ingredients B1 to B7 with each other, its definition will be examined in greater detail in the continuation of this specification.

A list will be found below of the ingredients B1 to B7 with the proportions which are recommended when these ingredients are employed separately to devise the active principle A+Bx (x=1, 2, 3, 4, 5, 6 or 7; these proportions express the weight percentage of each ingredient Bx in the combination A+Bx):

B1: from 2 to 50% and, preferably, from 10 to 40

B2: from 2 to 50% and, preferably, from 10 to 40

B3: from 1 to 30% and, preferably, from 2 to 20

B4: from 1 to 30% and, preferably, from 2 to 20

B5: from 2 to 50% and, preferably, from 10 to 40

B6: from 2 to 50% and, preferably, from 10 to 40

B7: from 1 to 30% and, preferably, from 2 to 20

When the coreactant B is a mixture B8 of two or more than two of the ingredients B1 to B7, the proportion which is recommended to devise the active principle A+B8 (this proportion expressing the weight percentage of the mixture B8 in the combination A+B8) is then situated between 1 and 80% and, preferably, between 5 and 50%. The partial proportions of each ingredient Bx (x=1, 2, 3, 4, 5, 6 or 7) in the mixture B8 (these proportions expressing the weight percentage of each ingredient Bx in the combination A+Bx):

on the one hand are chosen within the abovementioned ranges, and on the other hand are determined so that the overall proportion of the mixture B8 (expressing the weight percentage of the mixture B8 in the combination A+B8) lies between the abovementioned values, that is to say between 1 and 80% and, preferably, between 5 and 50.

Impregnating solutions in accordance with the present invention which are especially advantageous are those in which the active principle A+B has the following meanings S1 to S5:

* when it is desired to obtain an impregnating resin that in addition (besides good properties aimed at in relation to heat stability, toughness and rheology) exhibits a reactivity which is increased:

S1: A denotes at least one reactive thermoplastic poly(imide-amide) oligomer chosen from the group made up of the species A1, A2 and A3; B=B1, that is to say denotes an imide ingredient consisting of one or more imide compounds(s) chosen from the group made up of the species B1.1 and B1.2; the proportion of B1 represents 10 to 40% of the weight of the active principle;

* when it is desired to obtain an impregnating resin on the one hand additionally exhibiting an increased reactivity and, on the other hand, having an adhesive nature which is taken to its best level:

S2: A denotes at least one oligomer chosen from A1, A2 and A3; B=B8 and denotes a binary mixture of an imide ingredient B1 with an acrylate ingredient B2; the partial proportion of B1 represents 10 to 40% of the weight of the combination A+B1; the partial proportion of B2 represents 10 to 40% of the weight of the combination A+B2; the overall proportion of the mixture B8=B1+B2 represents 20 to 50% of the weight of the active principle;

* when it is desired to obtain an impregnating resin on the one hand additionally exhibiting an increased reactivity and, on the other hand, having a flow ratio which is taken to its best level:

S3: A denotes at least one oligomer chosen from A1, A2 and A3; B=B8 and denotes a binary mixture of an imide ingredient B1 with an alkenylphenol ingredient B3; the partial proportion of B1 represents 10 to 40% of the weight of the combination A+B1; the partial proportion of B3 represents 2 to 20% of the weight of the combination A+B3; the overall proportion of the mixture B8=B1+B3 represents 10 to 40% of the weight of the active principle;

S4: A denotes at least one oligomer chosen from A1, A2 and A3; B=B8 and denotes a binary mixture of imide ingredient B1 with a phenolic ingredient B4; the partial proportion of B1 represents 10 to 40% of the weight of the combination A+B1; the partial proportion of B4 represents 2 to 20% of the weight of the combination A+B4; the overall proportion of the mixture B8=B1+B4 represents 10 to 40% of the weight of the active principle;

* when it is desired to obtain an impregnating resin on the one hand additionally exhibiting a increased reactivity and, on the other hand, having an adhesive nature and a flow ratio which are at the same time taken to their best levels:

S5: A denotes at least one oligomer chosen from A1, A2 and A3; B=B8 and denotes a ternary mixture of an imide ingredient B1 with an acrylate ingredient B2 and with a phenolic ingredient B4; the partial proportion of B1 represents 10 to 40% of the weight of the combination A+B1; the partial proportion of B2 represents 10 to 40% of the weight of the combination A+B2; the partial proportion of B4 represents 2 to 20% of the weight of the combination A+B4; the overall proportion of the mixture B8=B1+B2+B4 represents 10 to 50% of the weight of the active principle.

Impregnating solutions which are still more especially advantageous are those in which the active principle A+B not only has the meanings S1 to S5 explained in the preceding section, but which is also devised by Starting with the constituents A and B, this time taken in their various preferred forms which have been defined above in the present specification.

When the coreactant B is a mixture B8 made up of two or of more than two of the ingredients B1 to B7, the said mixture B8 may in some cases be in the form of the product of reaction in the prepolymer stage of such an ingredient with any such and/or other ingredient chosen from the group B1 to B7. This is the case, for example, when B8 is a mixture of an imide ingredient B1 comprising a bisimide B1.2 with another (or several other) ingredient(s) taken from the group B2 to B7. Such reaction products in the prepolymer state are to be found described in particular in U.S. Pat. No. 5,206,338 and in U.S. Pat. No. 4,973,649. When the coreactant B of B8 kind is in the form of a prepolymer, it should be noted that the overall proportion of B8 may then advantageously represent up to 50 to 80% of the weight of the active principle.

The preparation of the impregnating solution according to the invention can be performed by various processes.

According to a first process the constituents A and B can be mixed directly in the physical state in which they are naturally to be found, with the chosen solvent(s), the operation being carried out with stirring and at a temperature ranging from ambient temperature (23° C.) to 140° C. It should be noted that if it is necessary to heat to facilitate the dissolution, the chosen temperature then must not exceed 140° C., in order to eliminate any risk of observing the appearance of a reaction of developing itself [sic] between the constituents A and B of the active principle.

According to an alternative form of this first process, the constituents A and B of the solutions according to the invention can be introduced in the form of a premix prepared beforehand by simple blending, in a manner known per se, at a temperature ranging from ambient temperature (23° C.) to 50° C., of the said constituents in the physical state in which they are naturally to be found. It should be noted that the mixtures A+B, taken as a product per se, also constitute a new substance and this involves the second subject to which the present invention relates.

According to a second process, which corresponds to a preferential method of application of the present invention, the impregnating solutions can be prepared by directly mixing, the operation being carried out with stirring and at a temperature ranging from ambient temperature (23° C.) to 140° C., the coreactant B with the crude reaction solution as obtained at the end of the process for the preparation of the reactive poly(imide-amide) oligomers A conducted in an aprotic polar solvent(s) medium; to have more details on a process of this type, reference should be made to the content of the abovementioned patent applications which were filed by the Applicant Company U.S. Pat. Nos. 4,927,894, 4,927,900 and 5,086,154). In the case of the use of a constituent A consisting of a number of reactive poly(imide-amide) oligomers, the coreactant B will be then mixed with all the corresponding crude preparation solutions. When the coreactant B is a mixture B8 made up of two or more than two of the ingredients B1 to B7 it is possible, for example, to operate by mixing a first fraction of coreactant B, optionally introduced in solution form, with the combination made up of (i) the crude reaction solution(s) containing the constituent A and (ii) the residual fraction of coreactant B. It should be noted that in all cases care will need to be taken, if necessary by making appropriate adjustments, that the concentration of the active principle A+B in the final impregnating solution is indeed within the abovementioned ranges.

The solutions in accordance with the present invention can be employed for the preparation of coatings, of adhesive bonding, of laminated materials in which the backbone may be in the form of woven or nonwoven sheets, of unidirectional components or of natural or synthetic staple fibers such as, for example, glass, boron, carbon, tungsten, silicon or aromatic polyamide filaments or fibers.

The solutions according to the present invention offer a very particularly advantage for obtaining preimpregnated intermediate articles. The impregnation of the fibrous material can be performed by the application of usual techniques such as immersion, doctor blade or curtain coating or impregnation by transfer. The transferable film and the preimpregnated articles can be employed directly or else can be stored with a view to subsequent use; they retain their properties remarkably during storage between 0° C. and 25° C.

The preimpregnated materials can be employed for the production of components of various shapes and for various functions in many industries such as, for example, in aeronautics. These components, which may be components of revolution, are obtained by laying a number of layers of prepregs onto a mold or a support.

The crosslinking is then performed under the usual technological conditions relating to composite materials and in particular at temperatures of between 180 ° and 300° C.

The prepregs can also be employed as reinforcements or means for repairing damaged components.

It is also possible, however, to devise components according to the filament winding technique with or without support, which are intended for the production of components of revolution, a technique employed especially for producing components associated with the motor vehicle and aeronautics industries.

The examples which follow illustrate how the present invention can be used in practice, no limitation being implied.

EXAMPLE 1

1. Example of application of the present invention:

The following are charged at ambient temperature (23° C.) into a 1-liter glass reactor fitted with a stainless steel anchor-type stirrer:

560 g of the crude reaction solution obtained at the end of the process of preparation of a poly(imide-amide) oligomer A3 conducted in N-methyl-2-pyrrolidone as solvent, by starting with 4,4'-diisocyanatodiphenylmethane, monoanhydride of trimellitic acid and 4-nadimidobenzoic acid; this crude reaction solution has an oligomer A3 concentration of 45% by weight;

63 g of N,N'-4,4'-diphenylmethanebismaleimide (coreactant B of B1.2 kind), and 77 g of N-methyl-2-pyrrolidone.

The mixture is stirred and its temperature is raised from 23° C. to 80° C. in 30 minutes with the aid of a thermosrated oil bath; the mixture is then kept stirred at 80° C. for another 15 minutes. The rosin or solution thus obtained is homogeneous: it has an active principle (A3+B1.2) concentration of 45% by weight and its viscosity at 50° C. is 1.31 Pas.

The viscosity referred to here is the dynamic viscosity; it is measured at 50°±0.1° C. with a Contraves Rheomat 30 viscometer fitted with a rotor rotating at a rotor rotating at a rate of 30 $s^{-1}$.

Prepregs are prepared with the aid of a machine for impregnating using the filament winding technique, the reinforcing fibers employed being carbon fibers manufactured by the company Softcar under reference Torayca T 300 3K 4OB.

The impregnating unit comprises essentially a reel for feeding fibers, a tank with an impregnating drum and a storage drum for the sheets based on impregnated fibers. The tank containing the impregnating solution is heated with the aid of a temperature-controlled heating fluid circulating in a jacket, so as to raise the temperature of the rosin to 45° C. The impregnating drum dips in the rosin, a doctor blade making it possible to regulate the thickness of the film of rosin on this rotating drum. Guided by pulleys, the carbon fiber roving runs over the impregnating drum and then is wound onto the storage drum covered with a paper coated with a silicone release coating. It is the rotation of the storage drum that makes the roving travel at a rate of 14 meters/minute. Situated after the fiber feed reel, a pulley integrally attached to a regulating arm allows the tension of the fiber roving to be regulated at 7 newtons. A device allows the impregnated roving to be moved along the surface of the drum; this device is programmed so as to obtain, at the end of each operation, an impregnated sheet 125 cm in length (circumference of the drum) by 11 cm in width. The sheet thus obtained consists of a unidirectional reinforcement comprising 200 g of carbon fibers and 270 g of rosin per m².

A number of impregnated sheets are prepared in this way and are stored between two sheets of paper coated with a silicone release coating. These sheets, positioned between two sheets of glass cloth treated with the aid of teflon [sic] are then dried in a ventilated oven at 140° C. for 20 minutes.

Starting with 4 sheets, 16 strips or (prepregs) [sic] of 24 cm×11 cm are then cut, which will be used to prepare a laminate by applying the technique known as "bag molding". According to this technique the following components are stacked on a stainless steel sheet (starting from the bottom upwards): 3 glass cloths (marketed by Porcher under reference 7628); then 1 glass cloth treated with the aid of teflon (marketed by Fothergill-Tygaflor under the name Tygavac TFG 075F); then the 16 24 cm×11 cm prepregs; then 1 glass cloth treated with the aid of teflon; then 3 glass cloths; then 3 glass cloths; then 1 perforated membrane (marketed by Airtech under the name Wrightlon 4600); and finally 2 glass mats (marketed by Airtech under the name Airweave UHT 800).

A bladder made of polyimide of Kapton trademark, which is put on top of this stack, is attached by its lower part to the metal sheet with the aid of an adhesive putty marketed by General Sealants under the name 300 S. An opening made in the metal sheet enables a partial vacuum to be established in the space containing the stack and situated under the bladder. The whole is placed in an autoclave and the following cure cycle is applied:

Temperature cycle:
  rise to 220° C. at a rate of 2° C./min,
  plateau at 220° C.: 1 hour,
  rise from 220° C. to 250° C. at a rate of 2° C./min,
  plateau at 250° C.: 15 hours,
  cooling to 23° C. at a rate of 3° C./min;
Pessure cycle:
  partial vacuum of $10^4$ Pa established inside the bag from the beginning of the temperature cycle and maintained until the end of a period of 1 hour after the beginning of the plateau at 250° C.,
  pressure of $10^6$ Pa established in the autoclave 15 minutes after the beginning of the plateau at 220° C. and maintained until the end of the cooling.

The laminate thus prepared is postcured for 5 hours at 300° C.

Mechanical tests performed on this laminate give the following results:

flexural properties according to ASTM standard D 790M:
  a flexural modulus (Mf) of 105 GPA is found;
toughness properties:
  an interlaminar shear strength (ILSS), according to ASTM standard E 2733 of 90 MPa is found;
  a crack propagation energy (GlC) of 750 J/m² is found;

this quantity is measured according to the protocol defined the [sic] "European Group of Fracture Polymer and Composites Task Group" in the work entitled "A protocol for interlaminar fracture testing of composites", 1988, P. Davies, EPLF, Switzerland.

the glass transition temperature (Tg) of the cured impregnating resin is 310° C. The glass transition temperature (Tg) corresponds to the abrupt drop in the elasticity modulus as a function of temperature. It can be determined on the graph representing the variations in the elasticity module as a function of temperature, variations which are measured by dynamic mechanical analysis with the aid of a DuPont model 982 DMA apparatus, at a rate of temperature rise of 3° C./min. The test pieces are conditioned at RHO (zero relative humidity), that is to say that they are placed in a desiccator over silica gel and dried for 24 hours at ambient temperature at $0.66$–$1.33\times10^2$ Pa before the measurements are performed.

2. Process for the preparation of the poly(imide-amide) oligomer A3 functionalized by nadimido groups:

The following are successively introduced at ambient temperature (23° C.) into a 25-liter stainless steel glass reactor fitted with a central propeller-type stirrer, a reflux condenser and a heating system using a jacket in which a heating fluid circulates, this reactor being maintained under a slight overpressure of dry nitrogen:

8,549 g of N-methyl-2-pyrrolidone,
  2,688 g (14 moles) of monoanhydride of trimellitic acid,
  1,585 g (5.6 moles) of 4-nadimidobenzoic acid, and
  4,200 g (16.8 moles) of 4,4'-diisocyanatodiphenylmethane.

The reaction mass is stirred for 20 minutes at ambient temperature. The stirring is then continued while the temperature rise protocol shown below is followed:

rise to 100° C. in 1 hour 15 minutes, and
  plateau at 100° C. for 5 hours 30 minutes.

The poly(imide-amide) solution thus obtained is a liquid mass which has a weight of 15,543 g; it has an oligomer A3 concentration of 45% by weight.

The structure of the oligomer A3 corresponds essentially to the following formula:

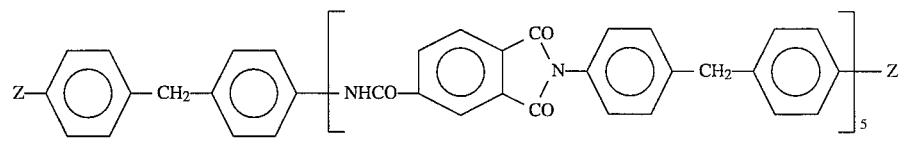

in which:

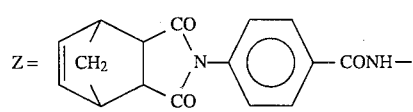

EXAMPLE 2:

The following are charged at ambient temperature (23° C.) into the same apparatus as that described in Example 1:
  15 g of phenol/formaldehyde polycondensate in which the molar ratio of formaldehyde to phenol is 0.7 and which has a softening point (according to the "ring and ball" technique and NF standard T 51 437) of 90° C., marketed by Perstorp SA under reference 853628 (coreactant B of B4 kind), and 91.7 g of N-methyl-2-pyrrolidone.

The following are added after dissolving at 80° C.:

533.3 g of the crude reaction solution of poly(imide-amide) oligomer A3, described in Example 1, and 60 g of N,N'-4,4'-diphenylmethanebismaleimide (coreactant B of B1.2 kind).

The mixture is stirred for 40 minutes while the temperature is raised from 35° C. to 80° C., and then for another 15 minutes at 80° C. The rosin obtained is homogeneous: it exhibits an active principle (A3+B1.2+B4) concentration of 45% by weight and its viscosity at 50° C. is 1.23 Pa s.

A laminate is then prepared by employing the same techniques (those of filament winding and of bag molding) and the same reinforcement (carbon fibers) as those employed in Example 1.

However, the following small differences in application should be noted:

with regard to the preparation of the impregnated sheets: the rosin deposit is 250 g/m2;

with regard to the lamination:

the pressure of $10^6$ Pa which is established in the autoclave is applied 30 minutes after the beginning of the plateau at 220° C.

The laminate thus prepared is postcured for 5 hours at 300° C.

Mechanical tests performed on this laminate give the following results:

Mf:105 GPa,

ILSS:90 MPa,

GlC:690 J/m$^2$,

Tg:290° C.

EXAMPLE 3:

The following are charged at ambient temperature (23° C.) into the same apparatus as that described in Example 1:

478.5 g of the crude reaction solution of poly(imide-amide) oligomer A3, described in Example 1, 67.3 g of N,N'-4,4'-diphenylmethanebismaleimide (coreactant B of B1.2 kind), 67.3 g of di(dioxyethylated) bisphenol A diacrylate, this compound being available commercially under the registered trademark Ebecryl 150 from the company UCB (coreactant B of B2 kind), and 86.9 g of N-methyl-2-pyrrolidone.

The mixture is stirred for 40 minutes while the temperature is raised from 23° C. to 80° C., and then for 20 minutes at 80° C. The rosin obtained is homogeneous: it has an active principle (A3+B1.2+B2) concentration of 50% by weight and its viscosity at 50° C. is 0.98 Pa s.

A laminate is then prepared by employing the same techniques and the same reinforcement as those employed in Example 1.

The following differences in application should, however, be noted:

with regard to the preparation of the impregnated sheets: the rosin is heated to 43° C. in the impregnation tank, the rosin deposit is 200 g/m$^2$;

with regard to the lamination: * new temperature cycle:

rise to 200° C. at a rate of 2° C./min, plateau at 200° C. for 1 hour, rise from 200° C. to 250° C. at a rate of 2° C./min, plateau at 250° C. for 15 hours, cooling to 23° C. at a rate of 3° C./min;

* the pressure of $10^6$ Pa which is established in the autoclave is applied 30 minutes after the beginning of the plateau at 200° C.

The laminate thus prepared is postcured for 5 hours at 280° C.

Mechanical tests performed on this laminate give the following results:

Mf:105 GPa,

ILSS:95 MPa,

GlC:850 J/m$^2$,

Tg:260° C.

We claim:

1. A solution comprising an active principle containing a reactive oligomer and at least one organic solvent for the oligomer, which active principle comprises:

(A) at least one reactive thermoplastic poly(imide-amide)oligomer selected from the group consisting of:

(A1) a linear aromatic poly(imide-amide) oligomer containing alkenyloxy end groups, which oligomer is obtained by direct reaction of (i) an aromatic diisocyanate, (ii) a monoanhydride of a tricarboxylic acid, and (iii) a monocarboxylic acid substituted by an alkenyloxy group;

(A2) a linear aromatic poly(imide-amide) oligomer containing maleimido end groups optionally substituted on the maleic double bond by a methyl group, which oligomer is obtained by direct reaction of (i) an aromatic diisocyanate, (ii) a monoanhydride of a tricarboxylic acid, and (iii) a monocarboxylic acid substituted by a maleimido group which may be substituted by a methyl group; and (A3) a linear aromatic poly(imide-amide) oligomer containing end groups each of which includes a residue with a latent maleimide functional group, which oligomer is obtained by direct reaction of (i) an aromatic diisocyanate, (ii) a monoanhydride of a tricarboxylic acid, and (iii) a carboxylic acid containing a residue with a latent maleimide functional group; and (B) a coreactant comprising a compound selected from:

(B1) at least one imide selected from the group consisting of:

(B1-i) a monoimide represented by the formula:

wherein in formula I:

each Y is identical or different and denotes H, CH$_3$ or Cl, and R$_1$ denotes H or an aliphatic, cycloaliphatic or aromatic monovalent hydrocarbon radical containing up to 20 carbon atoms, each hydrocarbon radical being unsubstituted or substituted by a Cl, alkoxy or alkenyloxy;

(B1-ii) an N,N'-bisimide represented by the formula:

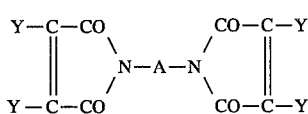

(II)

wherein in formula II: Y has the meaning given in formula I; A denotes a divalent radical selected from the group consisting of cyclohexylene, phenylene, 4-methyl-1,3-phenylene, 2-methyl-1,3-phenylene, 5-methyl-1,3-phenylene, 2,5-diethyl-3-methyl-1,4-phenylene, and a radical represented by the formula:

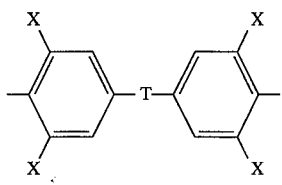

in which T denotes a single valency bond or divalent radical selected from the group consisting of:

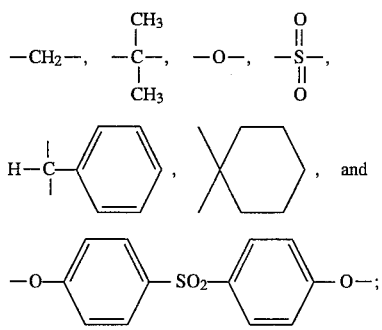

and each X is identical or different and denotes hydrogen, methyl, ethyl or isopropyl;

(B2) at least one acrylate represented by the formula:

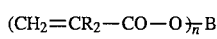 (III)

wherein in formula III: $R_2$ denotes hydrogen or methyl; n is a number of from 1 to 8;

B denotes an organic radical of valency n selected from the group consisting of: (i) a saturated, linear or branched aliphatic residue containing from 1 to 30 carbon atoms optionally interrupted by one or more oxygen atoms and optionally substituted by hydroxy groups; (ii) an aryl or araliphatic residue containing from 6 to 150 carbon atoms which is a benzene nucleus that is optionally substituted by one to three alkyl radicals containing from 1 to 5 carbon atoms or a number of benzene nuclei optionally substituted as indicated above and joined one to another by a single valency bond, an inert group or an alkylene radical containing from 1 to 3 carbon atoms, wherein the said aryl or araliphatic residue is optionally interrupted in its structure or one or more oxygen atoms and optionally substituted by one or more hydroxy groups, and wherein the free valencies of the aromatic radical B are optionally carried by a carbon atom of an aliphatic chain or by a carbon atom of a benzene nucleus;

(B3) at least one alkenylphenol represented by the formula:

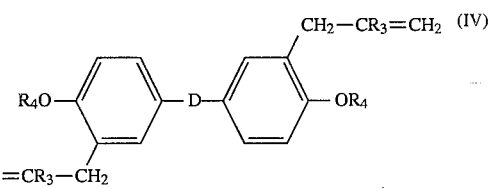 (IV)

wherein in formula IV: D denotes a single valency bond or divalent radical selected from the group consisting of:

each $R_3$ is identical or different and denotes hydrogen or methyl;

each $R_4$ is identical or different and denotes hydrogen, a linear or branched alkyl radical containing from 1 to 6 carbon atoms, or phenyl;

(B4) at least one thermoplastic phenol/formaldehyde polycondensate in which the molar ratio of formaldehyde to phenol is between 0.6 and 0.95 and the softening point ranges from 50° to 110° C.;

(B5) at least one coreactant other than an acrylate, containing a vinyl double bond which is selected from the group consisting of vinylpyridines, N-vinyl-2-pyrrolidone, vinyltetrahydrofuran, styrene, and mixtures thereof;

(B6) at least one nonhalogenated epoxy resin;

(B7) at least one amino coreactant containing one or more hindered diprimary diamines, which amino coreactant is selected from the group consisting of:

(B7-i) at least one compound represented by the formula:

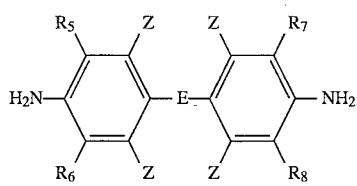 (V)

wherein in formula V:

$R_5$, $R_6$, $R_7$ and $R_8$ are identical or different and denote methyl, ethyl, propyl or isopropyl;

Z is identical or different and denotes hydrogen or chlorine;

E denotes a divalent radical selected from the group consisting of:

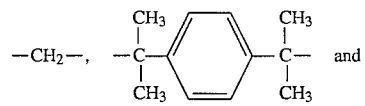

-continued

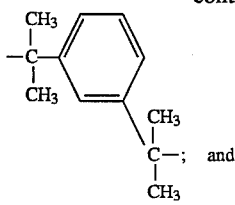

(B7-ii) at least one compound represented by the formula:

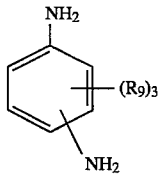 (VI)

wherein in formula VI:
the amino radicals are in meta or para position relative to one another;
each $R_9$ is identical or different and denotes methyl, ethyl, propyl or isopropyl; and (B8) a mixture of two or more of the coreactants (B1) to (B7);

wherein the concentration of the active principle, expressed as a mixture of A+B relative to the entire solution, is between 2% and 80% by weight, and the proportions of the ingredients B1 to B7, when these ingredients are employed separately to devise the active principle A1+Bx (where x =1, 2, 3, 4, 5, 6 or 7), are the following:

B1: from 2 to 50 ,

B2: from 2 to 50 ,

B3: from 1 to 30 ,

B4: from 1 to 30 ,

B5: from 2 to 50 ,

B6: from 2 to 50 ,

B7: from 1 to 30%, these proportions expressing the weight percentage of each ingredient Bx in the combination A+Bx.

2. A solution according to claim 1, wherein the reactive oligomer (A) is at least one oligomer selected from the group consisting of (A2) and (A3) which are obtained by directed reaction of:

(i) 4,4'-diisocyanatodiphenylmethane or 4,4'-diisocyanatodiphenyl ether;
(ii) the monoanhydride of trimellitic acid; and
(iii) a monocarboxylic acid containing a substituent consisting of: 4-maleimidobenzoic acid in the case of (A2); or 4-nadimidobenzoic acid or 4-(α-methylnadimido-)benzoic acid in the case of (A3).

3. A solution according to claim 1, wherein the coreactant (B1) is N,N'-4,4'-diphenylmethanebismaleimide or a mixture thereof with N,N'-2-methyl-1,3-phenylenebismaleimide, N,N'-4-methyl- 1,3-phenylenebismaleimide, N,N'-5-methyl- 1,3-phenylenebismaleimide or N-phenylmaleimide.

4. A solution according to claim 1, wherein the coreactant (B2) is an acrylate selected from the group consisting of:

(B2-i) a di(mono- or polyoxyethylated) bisphenol A di(meth)acrylate represented by the formula:

$$—(CH_2CH_2O)_p\text{-}B_2\text{-}(OCH_2CH_2)_q—$$ (VIII)

wherein in formula VIII:
$B_2$ denotes a divalent linear or branched alkylene radical containing from 2 to 9 carbon atoms optionally interrupted by one or more oxygen atoms, or $B_2$ is a radical represented by the formula:

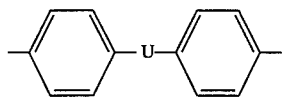

wherein U denotes a single valency bond or a divalent radical selected from the group consisting of

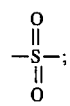

p and q, are identical and denote a number the range of 1 to 3; and (B2-ii) a novolac epoxy acrylate represented by the formula:

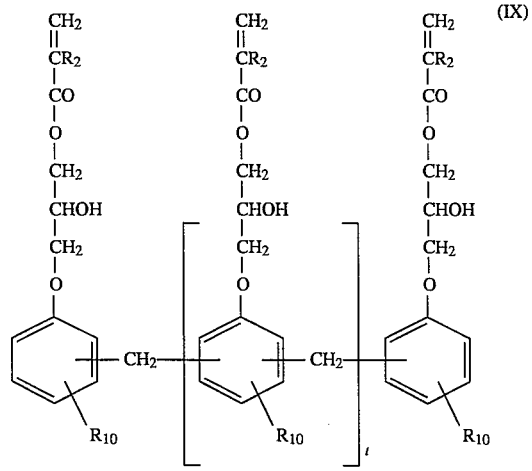

wherein in formula IX:
$R_2$ and $R_{10}$ denote a hydrogen atom and t is a number in the range from 0.1 to 5;

these compounds being taken by themselves or mixed with not more than 30% by weight, relative to the weight of the mixture, of trimethylolpropane triacrylate.

5. A solution according to claim 1, wherein the coreactant (B3) is O,O'-diallyl bisphenol A taken by itself or mixed with the diallyl ether of bisphenol A.

6. A solution according to claim 1, wherein the coreactant (B4) is a phenol/formaldehyde polycondensate in which the molar ratio of formaldehyde to phenol is between 0.65 and 0.85 and wherein the softening point ranges from 60° to 95° C.

7. A solution according to claim 1, wherein the coreactant (B6) is a glycidyl ether of a di(hydroxyphenyl)alkane having an epoxy equivalent weight of between 150 and 300.

8. A solution according to claim 1, wherein the coreactant (B7) is selected from the group consisting of 4,4'-diamino-3,3',5,5'-tetramethyldiphenylmethane, 4,4'-diamino-3,3',5,5=-tetraethyldiphenylmethane, 4,4'-diamino-3,3'-diethyl-5,5'-dimethyldiphenylmethane and mixtures thereof.

9. A solution according to claim 1, wherein the coreactant is a mixture (B8) of two or more of the ingredients (B1) to (B7) wherein the following proportions are employed:

the proportion of coreactant B, expressing the weight percentage of the mixture (B8) in the combination A+(B8) is between 1 and 80% by weight;

the partial proportions of each ingredient Bx (where x=1, 2, 3, 4, 5, 6 or 7) in the mixture (B8), expressing the weight percentage of each ingredient Bx in the combination A+Bx: are the following:

B1: from 2 to 50

B2: from 2 to 50

B3: from 1 to 30

B4: from 1 to 30

B5: from 2 to 50

B6: from 2 to 50

B7: from 1 to 30

10. A solution according to claim 1, wherein the active principle comprises a mixture of:

(A) at least one reactive thermoplastic poly(imide-amide) oligomer selected from the group consisting of the species (A1), (A2) and (A3); and (B) at least one imide (B1) selected from the group consisting of the species (B1-i) and (B1-ii);

wherein the proportion of (B1) represents 10 to 40% by weight of the active principle.

11. A solution according to claim 9, wherein the active principle comprises a mixture of:

(A) at least one oligomer selected from the group consisting of (A1), (A2) and (A3); and (B) a binary mixture (B8) of an imide (B1) with an acrylate (B2);

wherein the partial proportion of (B1) represents 10 to 40% of the weight of the combination A+(B1); the partial proportion of (B2) represents 10 to 40% of the weight of the combination A+(B2); and the overall proportion of the mixture (B8)=(B1)+(B2) represents 20 to 50% of the weight of the active principle.

12. A solution according to claim 9, wherein the active principle comprises a mixture of:

(A) at least one oligomer selected from the group consisting of (A1), (A2) and (A3); and (B) a binary mixture (B8) of an imide (B1) with an alkenylphenol (B3);

wherein the partial proportion (B1) represents 10 to 40% of the weight of the combination A+(B1); the partial proportion of (B3) represents 2 to 20% of the weight of the combination A+(B3); and the overall proportion of the mixture (B8)=(B1)+(B3) represents 10 to 40% of the weight of the active principle.

13. A solution according to claim 9, wherein the active principle comprises a mixture of:

(A) at least one oligomer selected from the group consisting of (A1), (A2) and (A3); and (B) a binary mixture (B8) of an imide (B1) with a thermoplastic phenol/formaldehyde polycondensate (B4);

wherein the partial proportion of (B1) represents 10 to 40% of the weight of the combination A+(B1); the partial proportion (B4) represents 2 to 20% of the weight of the combination A+(B4); and the overall proportion of the mixture (B8)=(B1)+(B4) represents 10 to 40% of the weight of the active principle.

14. A solution according to claim 9, wherein the active principle comprises a mixture of:

(A) at least one oligomer selected from the group consisting of (A1), (A2) and (A3); and (B) a ternary mixture (B8) of an imide (B1), an acrylate (B2) and a thermoplastic phenol/formaldehyde polycondensate (B4);

wherein the partial proportion of (B1) represents 10 to 40% of the weight of the combination A+(B1); the partial proportion of (B2) represents 10 to 40% of the weight of the combination A+(B2); the partial proportion of (B4) represents 2 to 20% of the weight of the combination A+(B4); and the overall proportion of the mixture (B8)=(B1)+ (B2)+(B4) represents 10 to 50% of the weight of the active principle.

15. A solution according to claim 1, wherein the solvent is selected from the group consisting of N,N-dimethylacetamide, N,N'-dimethylformamide, N-methyl- 2-pyrrolidone, dimethyl sulfoxide, 1,1,3,3-tetramethylurea, 1,3-dimethylurea, and a mixture of these solvents.

16. A process for the preparation of a solution according to claim 1 which comprises mixing the constituents (A) and (B) directly with the chosen solvent(s) the operation being carried out with stirring and at a temperature ranging from ambient temperature (23° C.) to 140° C., the constituents A and B—in the physical state in which they are—being introduced separately or in the form of a premix prepared beforehand by blending the constituents at a temperature ranging from the ambient temperature (23° C.) to 50° C.

17. An industrial product obtained by blending of the constituents (A) and (B) as claimed in claim 1 in the physical state in which they are, the operation being carded out at a temperature ranging from the ambient temperature (23° C.) to 50° C.

18. A process for the preparation of a solution according to claim 1 which comprises mixing the coreactant (B) directly with at least one crude reaction solution obtained at the end of the process for the preparation of the reactive poly(imide-amide) oligomers (A), conducted in an aprotic polar solvent(s) medium, the mixing operation being carded out with stirring at a temperature ranging from the ambient temperature (23° C.) to 140° C.

19. A method for the manufacture of preimpregnated intermediate articles which comprises applying the filament winding technique or that of the impregnation of various fibrous materials with a solution according to claim 1.

* * * * *